No. 738,362. PATENTED SEPT. 8, 1903.
H. J. SCHMITT.
VALVE.
APPLICATION FILED FEB. 24, 1902.
NO MODEL.

WITNESSES:
INVENTOR
Henry J. Schmitt
BY
ATTORNEY

No. 738,362. Patented September 8, 1903.

UNITED STATES PATENT OFFICE.

HENRY J. SCHMITT, OF WYNDMOOR, PENNSYLVANIA.

VALVE.

SPECIFICATION forming part of Letters Patent No. 738,362, dated September 8, 1903.

Application filed February 24, 1902. Serial No. 95,245. (No model.)

*To all whom it may concern:*

Be it known that I, HENRY J. SCHMITT, a citizen of the United States, residing at Wyndmoor, in the county of Montgomery, State of Pennsylvania, have invented certain new and useful Improvements in Valves, of which the following is a full, clear, and exact description, reference being had to the accompanying drawings, forming a part of this specification.

My invention relates to valves for steam, water, and other fluids, and has for its special object the tight seating of the valve-plug in its seat under all ordinary conditions of use.

The invention is embodied in a device containing the novel construction and combination of the several parts, as hereinafter fully described and claimed.

Figure 1:
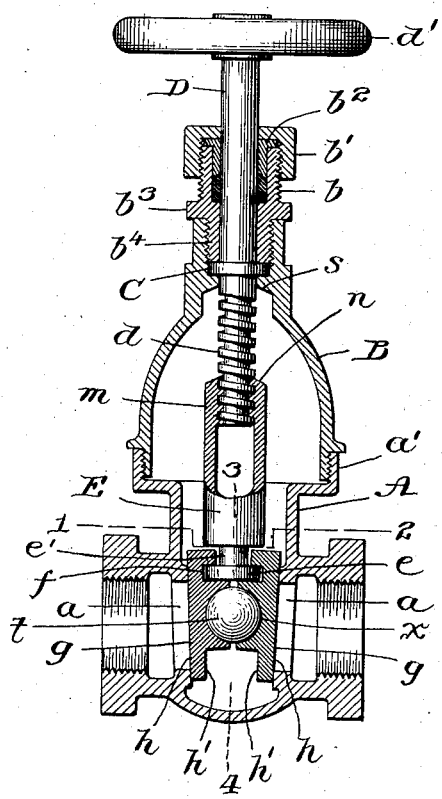
Figure 2:
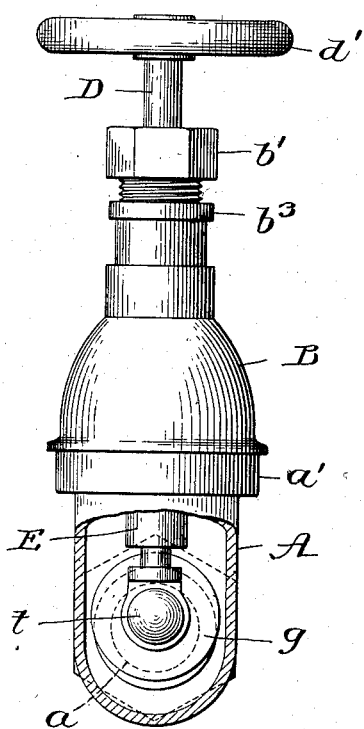
Figure 3:
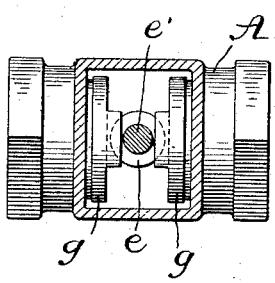

In the drawings illustrating my invention, Figure 1 is a central vertical section through the valve. Fig. 2 is an elevation, partly in section, the section being on the line 3 4 of Fig. 1; and Fig. 3 is a lateral sectional view on the line 1 2 of Fig. 1.

The body of the valve is indicated at A, having two opposite valve-seated openings $a\ a$ therein, which preferably converge or incline toward each other from top to bottom. As shown in the drawings, these valve-seats may be cut in the body of the valve, or they may be provided by means of annular rings screwed into the valve-body openings, as at B in Fig. 1 of Patent No. 675,979, granted to me June 11, 1901. The valve-body A is provided at the top with an annular extension A', which is flanged at $a'$. Secured to this flanged extension by like flanges is a bonnet B, provided with a stuffing-box $b$ and a retaining-cap $b'$ therefor. C is a rotatable guiding-flange held in place in said bonnet. D is the valve-spindle, journaled by said guiding-flange in the top of the bonnet below the stuffing-box. The valve-spindle has a screw-threaded downwardly-extending end $d$, always inclosed within the bonnet. The valve-spindle has an operating-wheel $d'$, as usual. The valve-plug has a carrier E with an interiorly-screw-threaded hollow end $m$, into which the screw-threaded end of the valve-spindle enters, and the said terminal end of the carrier is beveled at $n$. Said carrier is provided at its lower end with an annular plate $e$, connected therewith by a necked portion $e'$, forming a groove and enabling the annular plate $e$ of the carrier to enter the segmental recesses $f$ in the opposite sections of the valve-plug and whereby the latter is operated—*i. e.*, raised and lowered—by the valve-stem.

The leading feature of the invention resides in the sectional valve-plug, which is composed of two opposite valve plates or disks $g\ g$, each having segmental interior recesses or sockets $f$ at the upper end and preferably inclined faces $h$ at their backs or outer sides. Interiorly they are each centrally recessed at $x$ to form a semicylindrical recess at or about the longitudinal center of the plug-disk, which is thickened for the purpose at that point, leaving lips $h'$. A spherical ball is indicated at $t$, which is adapted to be held loosely within these opposite semicylindrical recesses $x$ in the opposite plates or disks $g\ g$ when the latter are assembled in the device to form the valve-plug, as shown in Fig. 1.

Another novel feature of my device of great utility is the construction of the plug-carrier E with a screw-threaded hollow end $m$, with beveled edges $n$, and providing the interior of the bonnet around the spindle-opening with a beveled surface $s$, adapted to register with the beveled end of the carrier when the plug is raised and the valve open. This construction makes a tight joint at that point and prevents all leak of steam or acids into the stuffing-box, whereby one is enabled to pack this valve even when wide open.

Another valuable feature of my device is the construction of the stuffing-box, its gland $b^2$, and packing-nut $b'$, whereby I secure a tight joint around the valve-stem, this being accomplished by forming the stuffing-box $b$ with an annular rim $b^3$ and below it a screw-threaded end $b^4$, entering the top of the bonnet, and exteriorly screw-threading the upper end $b$ above the annular flange $b^3$ and providing a screw-threaded packing-nut $b'$, adapted to register with the top of the stuffing-box and force down the gland $b^2$, inserted therein above the packing.

The operation of the device is as follows: The valve is opened by raising the valve-plates by means of the carrier and valve-spindle, the assembled parts contacting and holding the disk-plates in proper position relatively to each other and to the contained ball. When on a reverse movement the valve-plug is lowered to close the valve, the tendency of downward pressure will be to force the valve-plates outward at their lower sides or lips against the valve-seats and form a tight joint therewith, and, moreover, by this construction the disk-plates may rock in any direction on the ball as a fulcrum, and hence remain always in contact with the valve-seat.

I am enabled by my invention, for the several reasons stated, to get a fuller opening of the valve than heretofore possible and, moreover, allowing the device to be packed when fully open, if desired.

Having thus described my invention, what I claim as new, and desire to secure by Letters Patent, is—

1. The combination of a valve-casing provided with opposite valve-seated openings, a valve-plug consisting of two like disk-sections which are interiorly recessed to form oppositely-disposed recesses each in the form of a segment of a sphere, a spherical ball adapted to coincide with and be maintained in and between said opposite recesses when the parts are assembled, a carrier-stem having rotative connection with each of said disk-sections to move them simultaneously, and a screw-threaded spindle having operative engagement with the carrier-stem to raise and lower the same and the disk-sections.

2. The combination, with a valve-casing provided with opposite converging valve-seated openings, of a valve-plug composed of vertically-arranged disk-plates which are semispherically recessed interiorly, and each having segmental sockets or recesses adapted to engage with the annular collared end of a valve-carrier, and a ball adapted to be supported within said opposite semispherical recesses in the disk-plates when the parts are assembled.

In testimony whereof I have hereunto affixed my signature this 8th day of February, A. D. 1902.

HENRY J. SCHMITT.

Witnesses:
GEO. W. REED,
H. T. FENTON.